(12) United States Patent
Zhu et al.

(10) Patent No.: US 7,630,343 B2
(45) Date of Patent: Dec. 8, 2009

(54) SCHEME FOR OPERATING A WIRELESS STATION HAVING DIRECTIONAL ANTENNAS

(75) Inventors: Chenxi Zhu, Gaithersburg, MD (US);
Tamer Nadeem, Plainsboro, NJ (US);
Jonathan Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 617 days.

(21) Appl. No.: 11/389,014

(22) Filed: Mar. 27, 2006

(65) Prior Publication Data
US 2006/0240780 A1    Oct. 26, 2006

Related U.S. Application Data

(60) Provisional application No. 60/669,381, filed on Apr. 8, 2005.

(51) Int. Cl.
*H04Q 7/00* (2006.01)
(52) U.S. Cl. .................. 370/334; 370/328; 370/342; 455/562.1; 342/368
(58) Field of Classification Search .............. 370/334, 370/342, 328; 455/562.1; 342/368
See application file for complete search history.

(56) References Cited

U.S. PATENT DOCUMENTS

| | | | | |
|---|---|---|---|---|
| 7,546,103 B1* | 6/2009 | Kopikare et al. | ......... | 455/277.1 |
| 2004/0102193 A1* | 5/2004 | Kitami et al. | ............ | 455/435.3 |
| 2004/0196812 A1* | 10/2004 | Barber | ...................... | 370/334 |
| 2004/0240486 A1* | 12/2004 | Venkatesh et al. | ........... | 370/537 |
| 2005/0141545 A1* | 6/2005 | Fein et al. | .................... | 370/445 |
| 2006/0002319 A1* | 1/2006 | Lee et al. | ................. | 370/310.1 |

FOREIGN PATENT DOCUMENTS

| | | |
|---|---|---|
| EP | 1 448 006 A2 | 8/2004 |
| WO | WO 03/026221 A1 | 3/2003 |

OTHER PUBLICATIONS

Extended European Search Report Communication, including European Search Opinion, issued Oct. 17, 2006 in European Application No. 06007379.8-2412 related to the present above-identified U.S. patent application (the references cited therein disclosed in IDS of Sep. 11, 2006) (13 pages).

(Continued)

*Primary Examiner*—Danh C Le
(74) *Attorney, Agent, or Firm*—Staas & Halsey LLP

(57) ABSTRACT

Disclosed is a wireless station having a receiver and a network allocation vector associated with each of a plurality of directional antennas. The receivers concurrently listen for frames from remote stations. When any receiver detects a frame from a remote station, the receiver activates its associated NAV. The station has one or more transmitters that can transmit using the antennas. While transmitting a signal using an antenna, the receivers associated with any non-transmitting antennas continue to listen for signals from remote stations. The station cancels any signals from the transmitting antenna received by the non-transmitting antennas. To perform the cancellation, the station performs a self-calibration procedure. The station can self-calibrate by either silencing neighboring stations or by inserting null tones into a transmitted calibration signal.

18 Claims, 10 Drawing Sheets

OTHER PUBLICATIONS

Chenxi Zhu, Tamer Nadeem, and Jonathan Agre, "Enhancing 802.11 Wireless Networks with Directional Antenna and Multiple Receivers", Fujitsu Laboratories of America, Technical Memorandum No: FLA-PCR-TM-21.

Second Chinese Office Action mailed Mar. 20, 2009 in corresponding Chinese Application No. 20061006737583, (5 pages) (6 pages English translation).

Communication Under Rule 71(3) EPC issued Jul. 21, 2008 in EP Application No. 06 007 379.8-2412.

Decision to grant a European patent pursuant to Article 97(1) EPC issued Nov. 27, 2008 in Application No. 06007379.8-2412/1710960 (1 page).

First Notification of Office Action issued by the State Intellectual Property Office of China on Jul. 25, 2008 in Application No. 200610073758.3, including the Text of the First Office Action (5 pages with an additional 8 pages of English language translation).

Young-Bae Ko, et al., "Medium Access Control Protocols Using Directional Antennas in Ad Hoc Networks", Department of Computer Science, Texas A&M University, College Station, TX (USA); 2000 IEEE, IEEE Infocom 2000, pp. 13-21.

Mineo Takai, et al., "Directional Virtual Carrier Sensing for Directional Antennas in Mobile Ad Hoc Networks", XP-001171558; *MOBIHOC* '02, Jun. 9-11, 2002, EPFL, Copyright 2002 ACM 1-58113-501-7/02/0006, pp. 183-193.

Communication from European Patent Office with a partial European Search Report for European Application No. 06007379.8-2416 corresponding to the present above-identified pending U.S. patent application; Dated Aug. 1, 2006 (6 pages).

Chenxi Zhu, et al., "Fujitsu Laboratories of America", Technical Memorandum, No.: FLA-PCR-TM-21; Pervasive Computing Research; XP-002390597, Mar. 6, 2005 (12 pages).

Chinese Office Action issued Sep. 18, 2009 in corresponding Chinese Application No. 200610073758.3, 5 pages (translation 4 pages).

\* cited by examiner

SCHEME FOR OPERATING A WIRELESS STATION HAVING DIRECTIONAL ANTENNAS

CROSS-REFERENCE TO RELATED APPLICATIONS

This application is related to and claims priority to U.S. Provisional Application No. 60/669,381, filed Apr. 8, 2005, in the U.S. Patent and Trademark Office, the contents of which are incorporated herein by reference.

BACKGROUND OF THE INVENTION

1. Field of the Invention

The present invention is directed to wireless networking. Specifically, the invention pertains to a method of operating a wireless station using directional antennas.

2. Description of the Related Art

Wireless networks have enjoyed tremendous popularity in recent years. A consequence of increasing deployment of wireless networks, coupled with limited number of channels and unlicensed spectrum usage, is that the interference between transmissions is becoming a serious problem.

Using directional (or sectorized) antennas is a method to reduce the interference and to increase the range and the capacity for wireless networks. In general, network capacity is increased as a consequence of spatial spectrum reuse, and transmission range is extended due to the increased gain from directional transmission.

Directional antennas have also been proposed to improve the performance of 802.11 based wireless networks. However, the original 802.11 protocol was not designed for directional antennas. It assumes that all the frames (RTS/CTS/DATA/ACK frames) are transmitted as omnidirectional signals that are received by all nearby wireless stations. When directional antennas are used, new problems such as the enhanced hidden station problem and the deafness problem, arise. They increase the likelihood of collisions. A satisfying solution completely within the 802.11 framework has not yet been reported. What is needed is a new scheme for fully exploring the potential of directional antennas with the 802.11 protocol.

SUMMARY OF THE INVENTION

The present invention relates to a method of operating a wireless station having multiple directional antennas. A receiver is associated with each antenna, and, concurrently, each receiver listens for signals from remote wireless stations. Associated with each receiver and antenna is a backoff timer. When any of the receivers receives a transmission from a remote station, the station activates the backoff timer associated with the receiver.

When a receiver receives a transmission from a remote station, the local station can also store an association between the remote station and the antenna or receiver receiving the signal from the remote station. The station can also store information that describes the quality of the wireless signal received. This quality information can be updated based on a timer set when the information is stored.

The station also includes one or more transmitting modules. Each of the modules can transmit signals using any of the multiple directional antennas. While a transmission module transmits a signal using one of the antennas, the station continues to listen for signals from remote wireless stations using the other antennas not involved with the transmission. If the other antennas receive the signal transmitted by the transmission module, the station can cancel the signal transmitted by the transmission modules from the overall signal received at the receiver. To determine what to cancel, the station can perform a self-calibration procedure by silencing neighboring stations then by transmitting a signal from each of the directional antennas. Additionally, self-calibration can be done without silencing the neighboring stations. To accomplish this, the station could detect collisions by inserting null tones into the calibration signal.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention is a new scheme called sectorized MAC ("S-MAC"), which uses multiple directional antennas and multiple receivers to provide 360 degree coverage around a station. The scheme allows a station transmitting in some sectors to receive in others. It addresses the hidden station problem and the deafness problem by continuously monitoring the channel in all directions at all time for remote stations. The S-MAC protocol lends itself to both ad hoc mode and infrastructure mode, and can readily inter-operate with stations using an omni antenna. In fact, the sectorized operation of S-MAC is transparent to a regular omni station. A regular station can operate with the belief that all stations are omni and operate with the standard 802.11 MAC.

Figure 1:
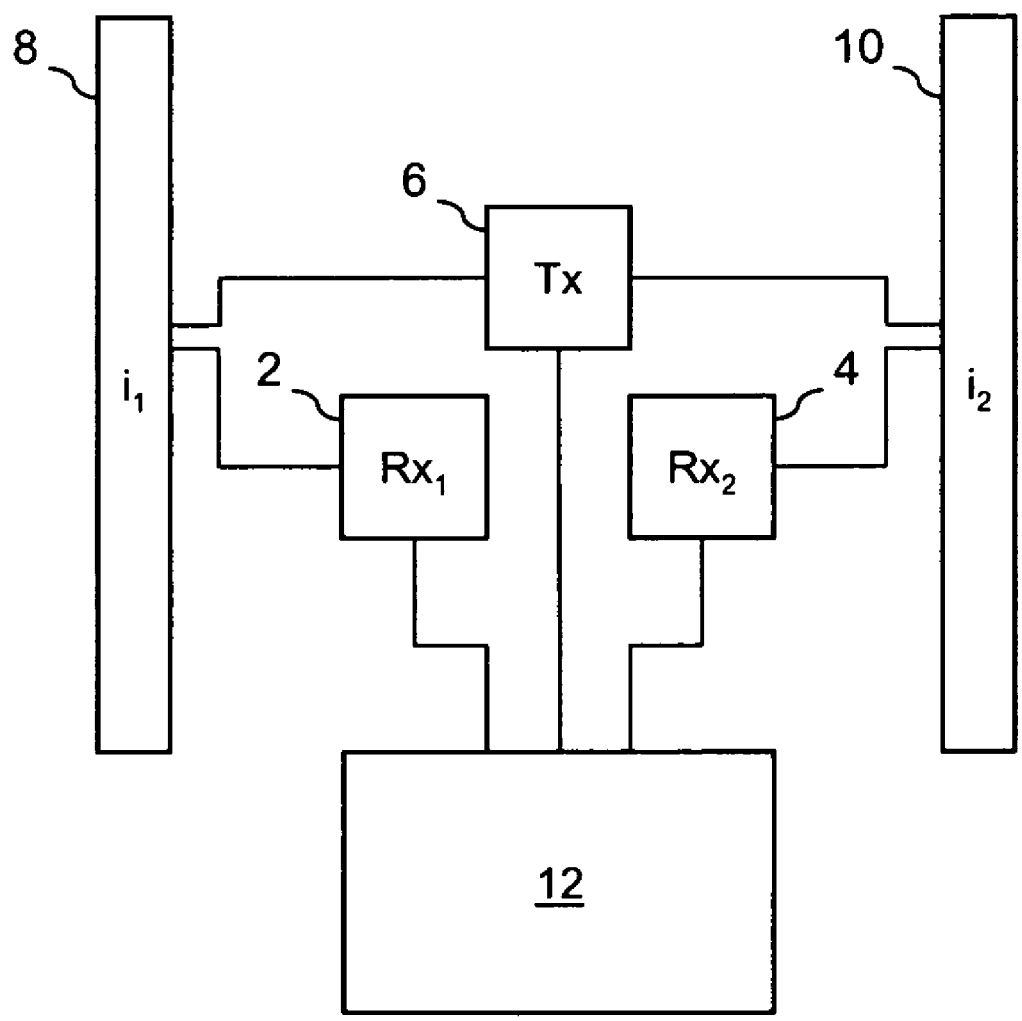
FIG. 1 illustrates a wireless station having two receiving modules and one transmitting module.

The coverage area of an S-MAC station is divided into M antennas, with directional antennas $i_1$ through $i_M$ corresponding to each sector. The sectors could overlap due to antenna side lobes and back lobes. The station is equipped with M receiving modules ("Rx") and one or more transmission modules ("Tx"). FIG. 1 shows an embodiment of the architecture of an S-MAC station 100. The embodiment shown in FIG. 1 includes two antennas, 8 and 10, two receiving modules, 2 and 4, and one transmission module, 6, that can transmit using either antenna 8 or antenna 10. Each Rx connects to a corresponding antenna i, thus receiving signals only from sector i. The Tx module, 6, can switch to any one of the antennas and transmit signals in the corresponding sector. The present invention is intended to be used in any type of wireless station such as stand-alone wireless gateways or routers, computers having plug-in cards providing wireless functionality, laptops with integrated wireless hardware, appliances, such as refrigerators, having integrated wireless hardware, cell phones, etc. Part 12 represents other elements used by the wireless station such as processing capabilities, memory, etc.

Figure 2:
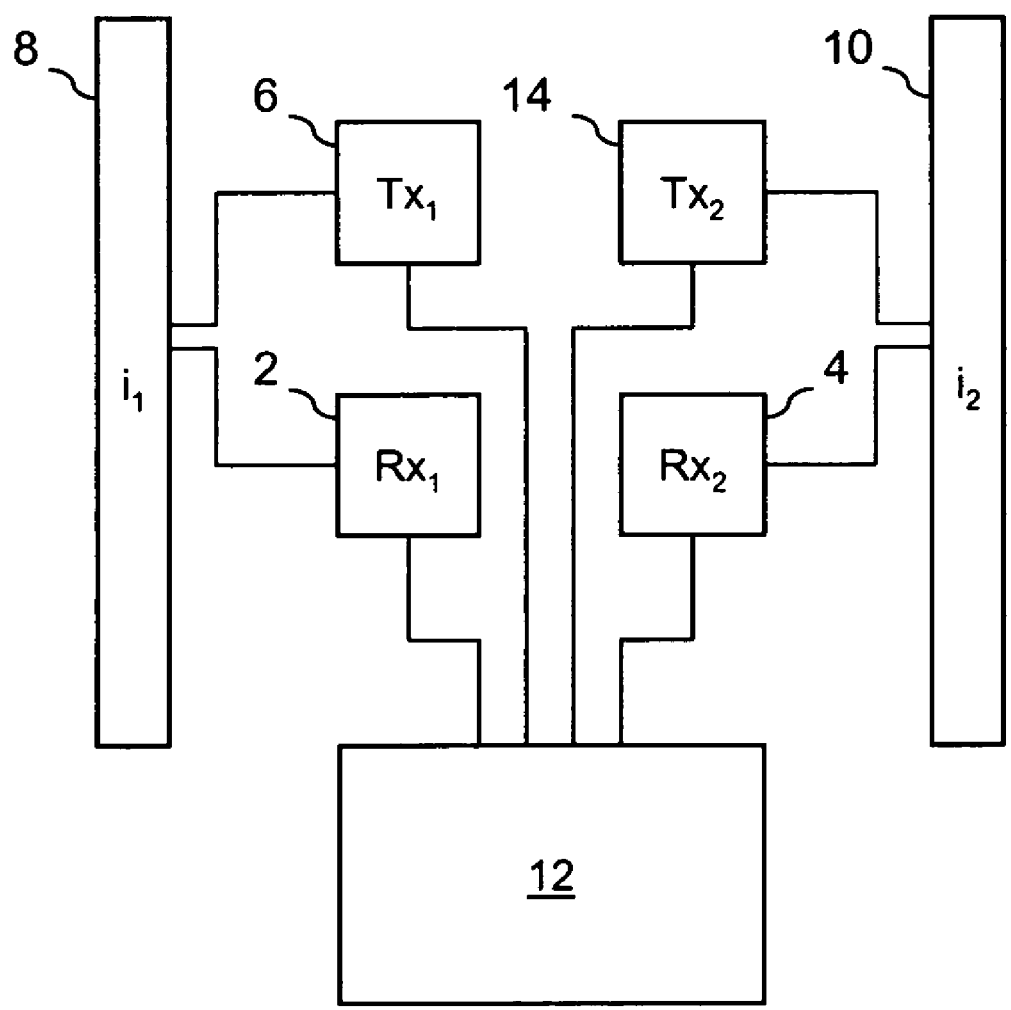
FIG. 2 illustrates a wireless station having two receiving modules and two transmitting modules.

Multiple transmitters could be used with S-MAC to further enhance the capacity. FIG. 2 illustrates an embodiment of an S-MAC station 200 that includes separate transmitters, 6 and 14, associated with antennas 8 and 10. Additionally, multiple transmitters could be independently switched to any of the antennas with the constraint that transmitters do not simultaneously transmit with the same antenna.

The Tx and Rx modules in a S-MAC station are connected to a single MAC module, and at the physical layer ("PHY"), the M Rx modules can be logically separate. The antennas can be either fixed wide-beam directional antennas or electrically controlled antenna array. For the latter case there is no need for dynamic beam-forming or angle of-arrival estimation.

Figure 3:
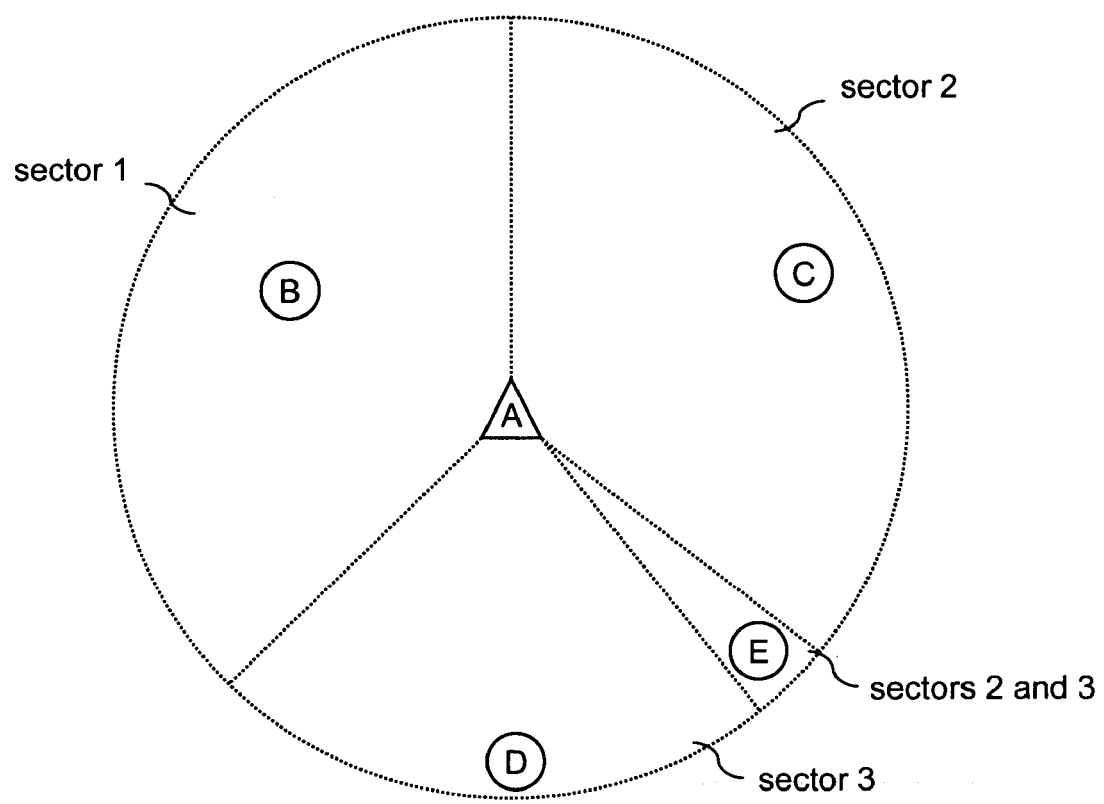
FIG. 3 illustrates a S-MAC station in a network of wireless stations.

FIG. 3 illustrates a wireless network 300 having an S-MAC node, node A, and several other wireless nodes, nodes B-E, which could be any type of wireless nodes. In this example, node A has three directional antennas, each associated with a receiver, $Rx_1$, $Rx_2$, and $Rx_3$ (not shown). This creates three sectors, sector 1, sector 2, and sector 3. In this example, receiver $Rx_1$ would receive signals from node B. Receiver $Rx_2$ would receive signals from nodes C and E, and receiver $Rx_3$ would receive signals from nodes D and E. Note that because signals from node E can be received by both $Rx_2$ and $Rx_3$, node E is treated as if it is in two sectors.

Figure 4:
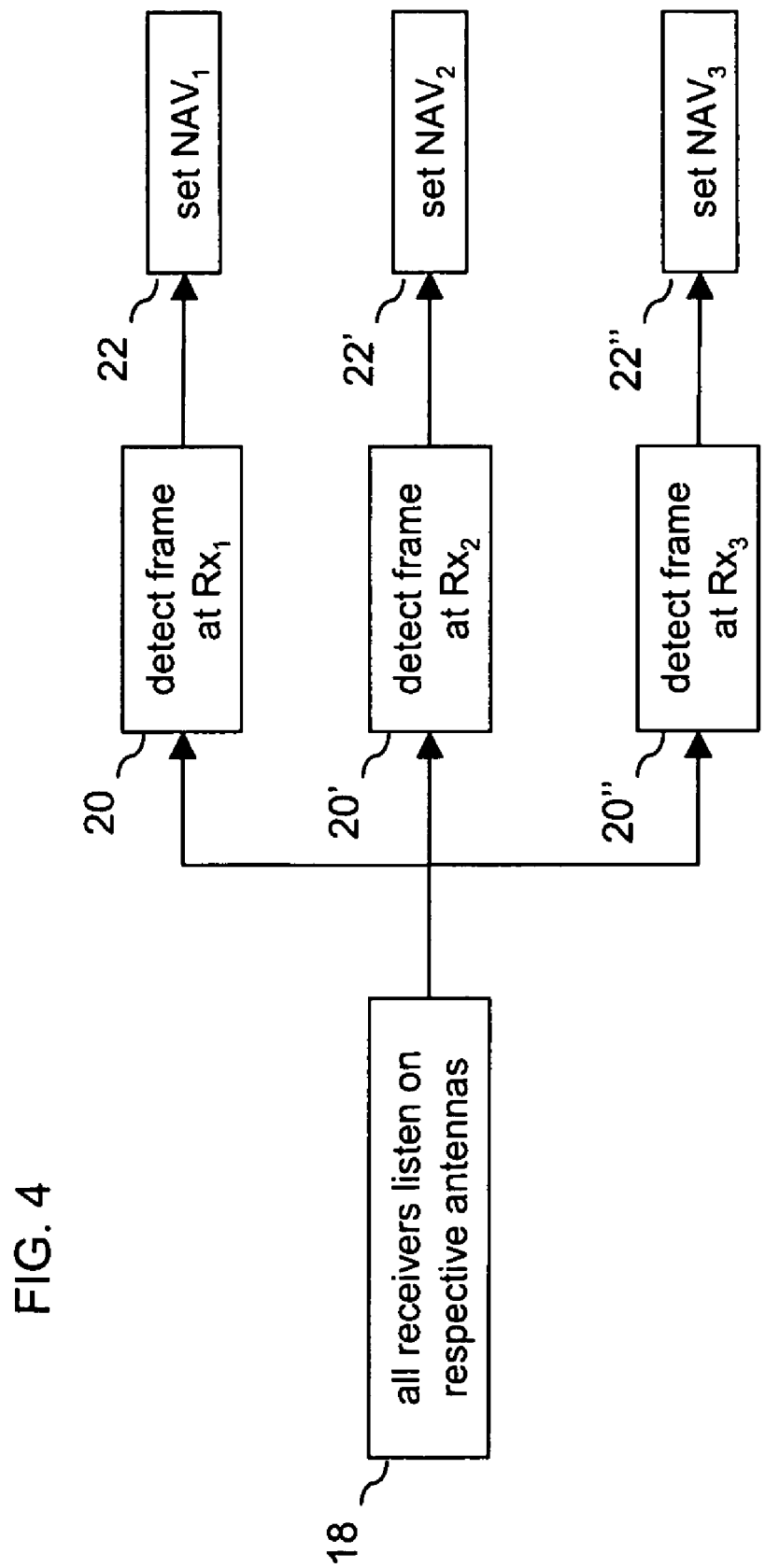
FIG. 4 illustrates a procedure for operating multiple receivers to concurrently listen for remote wireless stations.

FIG. 4 shows a process for operating multiple Rx modules to concurrently listen for signals from remote nodes. As illustrated as operation 18, when the Tx module associated with an S-MAC station is not transmitting, all the Rx modules are listening from their respective antennas. Because an S-MAC station always listens for incoming frames from remote stations in all directions, it is aware of all the remote stations within its range which transmits in its way. By checking which antenna receives the frame, it also learns in which sector these neighbors are located.

To accomplish this function, an S-MAC station maintains and updates backoff timers known as network allocation vectors ("NAV") with a procedure similar to the standard distributed coordination function ("DCF") procedure. The NAV table associated with the M sectors and N transmitters has the following structure: $SNAV=[NAV_{Tx1}, \ldots, NAV_{TxN}, NAV_1, NAV_2, \ldots, NAV_M]$, where $NAV_{Tx1}$ through $NAV_{TxN}$ describes the allocation (busy time) of the N Tx modules, and $NAV_i$ describes the allocation of the channel in sector i. Any one of $NAV_{Tx1}$ through $NAV_{TxN}$ is set when its corresponding Tx module is involved in a transmission in any sector, where the length could be equal to the duration of the transmission (RTS/CTS/DATA/ACK four way handshake or DATA/ACK two way handshake time). $NAV_i$ is set following the standard DCF procedure for any transmission taking place in sector i, where the length could be equal to the duration of the transmission (RTS/CTS/DATA/ACK four way handshake or DATA/ACK two way handshake time), no matter if the transmission involves the S-MAC station itself or the transmission is between any two other nodes, at least one of which is located in sector i (and its transmission received by antenna i of the S-MAC node). For example, if any Rx of an S-MAC station receives a RTS or CTS or DATA frame transmitted between another pair of stations, as illustrated by operations 20-20", then the station sets the appropriate $NAV_i$ accordingly at operations 22-22". It is possible that the S-MAC station might receive the same RTS or CTS with more than one of its receivers. In this case, all the NAV in these sectors are set. Note that the station does not need to tell whether the source or the destination station of the transmission uses S-MAC. Note that direction and beam width information are absent from the table. This is because the direction and beam width of each antenna are fixed, so the protocol is agnostic of such information. To account for overlapping between coverage areas of different antennas, the protocol can utilize a location/link quality table described later. The S-MAC node uses its SNAV to determine if it can initiate a transmission to another node, or if it can respond positively (reply with CTS packet) to a transmission request from another node.

Besides virtual carrier sensing, an S-MAC station needs to carry out physical carrier sensing (clear channel assessment), which could be done according to the 802.11 standard. In S-MAC, physical carrier sensing is done on a per-sector basis with the respective Rx module. An S-MAC station can send or respond to a RTS frame in a given sector only if the physical medium is sensed clear by the corresponding Rx.

Figure 5:
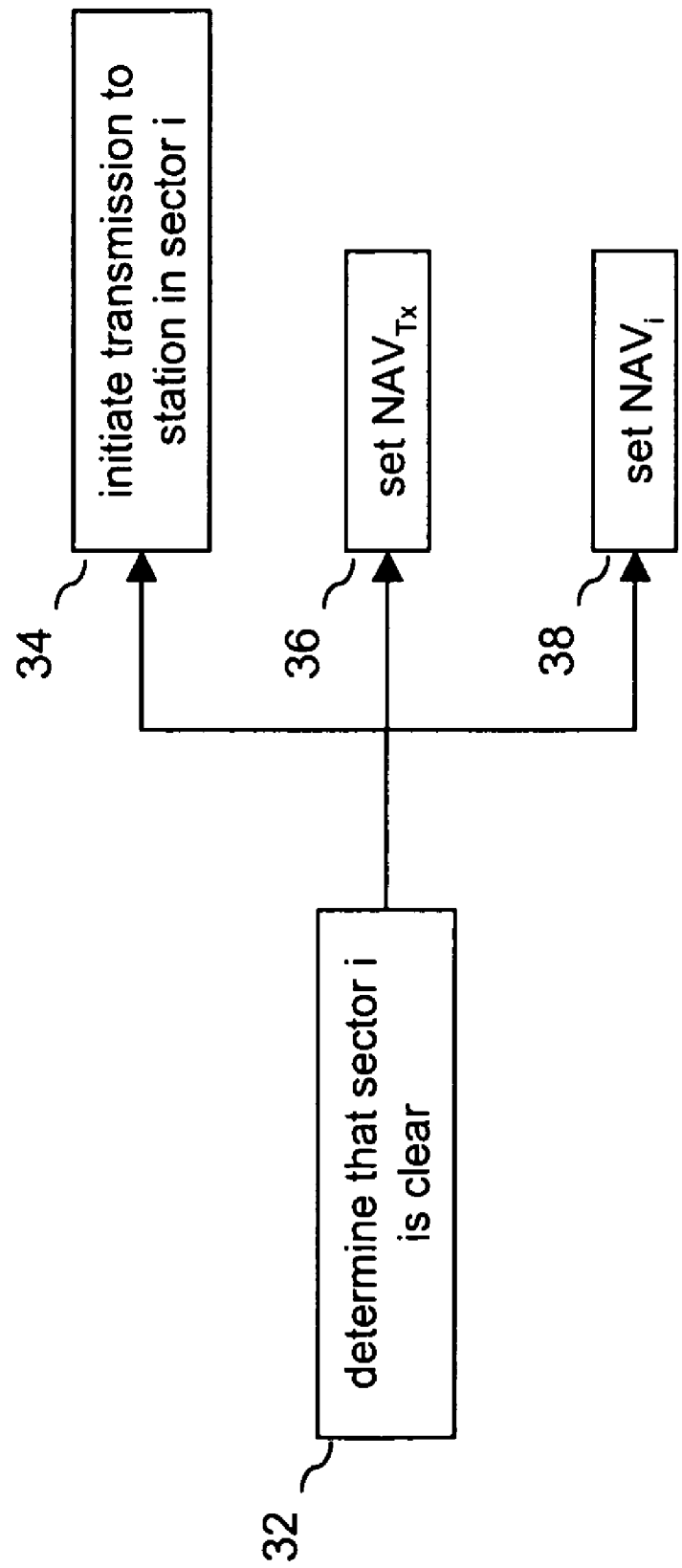
FIG. 5 illustrates a procedure for transmitting a signal.

As shown in FIG. 5, after the S-MAC station determines that the channel in sector i is free with physical and virtual carrier sensing (checking $NAV_i$), 32, and at least one Tx module k ($NAV_{Txk}$) is free, it may initiate a transmission to another station in sector i by sending a RTS through antenna i, 34. It sets $NAV_{Txk}$ and $NAV_i$ accordingly, operations 36 and 38. If it receives a CTS frame successfully with $Rx_i$, the DATA/ACK exchange will follow through antenna i. If no CTS is received, it will reset $NAV_{Txk}$ and $NAV_i$. If the S-MAC station receives a RTS frame destined for itself through antenna i, after it checks that $NAV_i$ and at least one Tx module k ($NAV_{Txk}$) is free, it may respond with a CTS packet. It sets $NAV_i$ and $NAV_{Txk}$ properly with the duration advertised in the RTS packet.

In the case that the S-MAC station can transmit to its destination through multiple antennas, the S-MAC station sets the NAV for all these sectors. Among these sectors which are not blocked by other transmissions (whose NAV are not set), the S-MAC station chooses the sector with the best link quality, as will be described shortly. Once making a decision, the S-MAC station will use that antenna for the entire four way handshake. For example, if the S-MAC node wants to initiate a transmission to another node which can be reached through antenna i or j (indicated by the location register of the user), it needs to check if $NAV_i$ or $NAV_j$ is not set. Among these sectors that are not blocked, it chooses the sector (sector i for example) with the best link quality to the destination and sends the RTS packet through antenna i, provided a Tx (Tx k for example) is available. It sets $NAV_i$ and $NAV_{Txk}$ properly. If it receives a RTS packet destined for itself from another node through antenna i and j, it first checks $NAV_i$ and $NAV_j$ and $NAV_{Tx1}$ through $NAV_{TxN}$. If both $NAV_i$ and $NAV_j$ are not set, and at least one of the NAVs for the transmitters is not set ($NAV_{Txk}$ for example), it will set $NAV_i$, $NAV_j$, and $NAV_{Txk}$ corresponding to the duration in the RTS packet and reply with a CTS packet. If $NAV_i$ or $NAV_j$ is occupied or there is no available Tx ($NAV_{Tx1}$ through $NAV_{TxN}$ are all set), it will not respond to the RTS packet.

Figure 6:
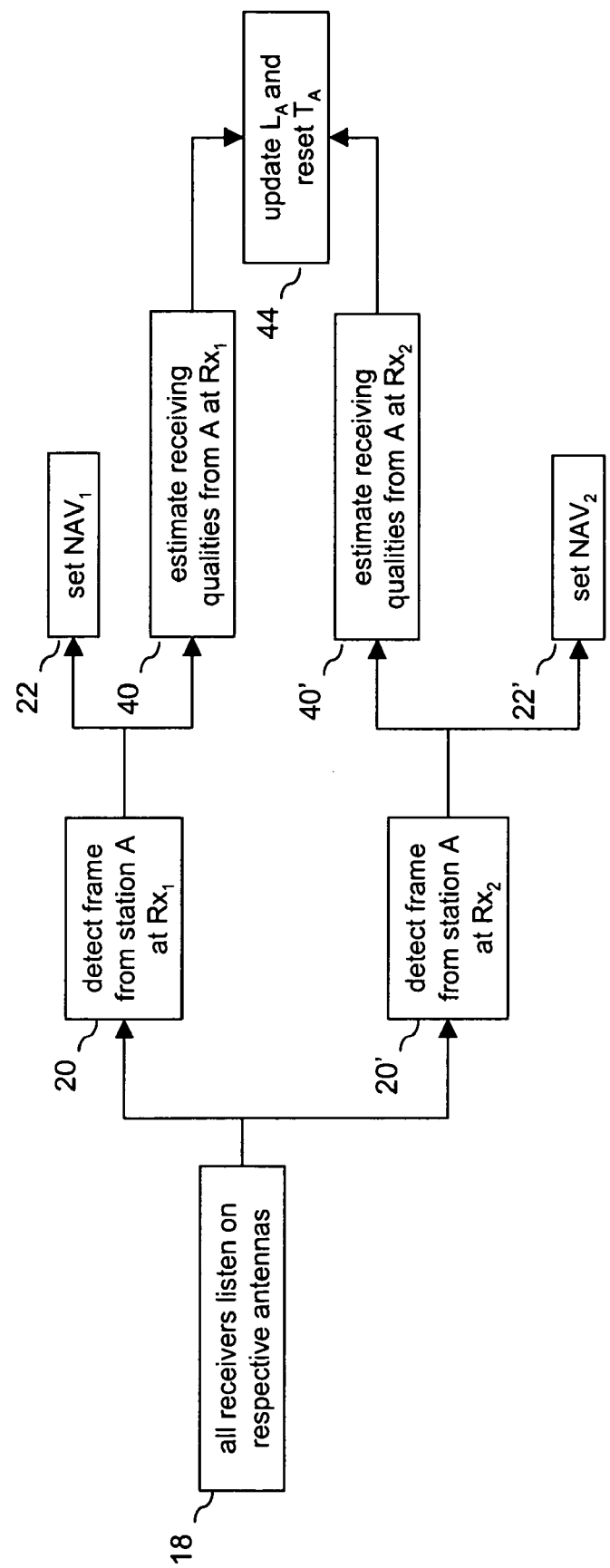
FIG. 6 illustrates a procedure for operating multiple receivers to concurrently listen for remote wireless stations and to store receiving qualities of the signals received.

As illustrated in FIG. 6, an S-MAC station can keep track of the location (sector) of each associated neighboring station and its link quality. For each neighbor A, which might include an one-hop neighbor station in an ad hoc network or an associated station in infrastructure mode, an S-MAC station maintains a location/link quality vector $$L_A=\{(i,q_i^A), (j,q_j^A), \ldots\},$$

where a pair $(i, q_i^A)$ means that station A can be reached through antenna i with acceptable link quality $q_i^A$ (measured by signal strength or signal-to-noise ratio ("SNR")). The entries in $L_A$ are ordered in descending link quality. Each time an S-MAC station receives a frame from A, it estimates and compares the receiving qualities from all the antennas, operations 40 and 40', and updates $L_A$, operation 44.

Maintaining the location information in multiple sectors increases flexibility. For example, if A can be reached through more than one antenna, and at the time of transmission the first sector in $L_A$ is blocked in SNAV, then the S-MAC station can communicate with A through another un-blocked sector. This reduces the chance of unnecessary blocking to station A. This diversity is achieved in overlapping coverage areas between different antennas. Notice that these overlapping areas are often present due to antenna patterns like side lobes. S-MAC can handle these overlaps without detailed information of the beam patterns.

Suppose a four way handshake is initiated by another station to an S-MAC station, and the RTS frame is received by $Rx_i$ at the S-MAC station. First $NAV_i$ and $NAV_{Tx}$ are checked. If both of them (and physical carrier sensing) are free, a CTS frame will be sent by Tx through antenna i, and $NAV_i$ and $NAV_{Tx}$ will be updated with the duration of the transmission field in the RTS. Other stations (omni or S-MAC) receiving the RTS or CTS will update their NAVs and respect this channel reservation. Having secured the channel, the station initiating the handshake starts transmitting the DATA frame and the S-MAC station will receive with $Rx_i$. After successfully receiving the DATA frame, the S-MAC station sends its ACK through sector i. On the other hand, if the S-MAC station finds that either $NAV_i$ or $NAV_{Tx}$ is busy, it will not respond to the RTS and its SNAV remains unchanged. In this case, the station sending the RTS will back off.

If the RTS is received successfully by more than one Rx modules, say $Rx_i$ and $Rx_j$, and the channel is available in all these sectors, the S-MAC station will send the CTS in sector i if it finds the best receiving quality (measured by SNR of the RTS frame) in $Rx_i$. This may happen if the other station is in the overlapping area of sector i and j. As the CTS is sent in sector i, $NAV_i$, $NAV_j$ and $NAV_{Tx}$ are all updated. It is possible that the S-MAC station receives more than one RTS frames from different neighbors successfully in different sectors. It can choose among the contenders based on channel availability in these sectors, and factors like link quality and user priority. It then sends the CTS to the selected target through the corresponding antenna and ignores the rest.

In order to handle user mobility, a S-MAC station associates a timer $T_A$ with the $L_A$ of a station, $STA_A$, making $L_A$ soft-state. The duration of the timer depends on the observed mobility history of a station and varies from station to station. Each time a frame is received from $STA_A$, $T_A$ is reset as $L_A$ is updated, as shown in FIG. 6 at operation 44. $T_A$ expires when no frame is received from $STA_A$ for a certain time. When $T_A$ expires, $L_A$ is not erased, but is marked as stale and kept for future reference.

For example, for a station functioning as an access point ("AP"), if the AP needs to start a transmission to $STA_A$ after $T_A$ has expired, the AP will first try to contact $STA_A$ in the sectors listed in $L_A$. The AP could conduct the search using a serial search method, starting in a first sector in $L_A$, then moving on to a next sector in $L_A$ after deciding the STA is not in the first sector. For example, the AP could move on after sending 8 un-responded RTS frames with increasing back-off intervals.

Another way is to search in all the sectors listed in $L_A$ in parallel. When a single transmitter, TX, is employed, the AP can multiplex the RTS frames in all the sectors. By multiplexing, it tries to conduct the search in all these sectors as soon as possible. In a given sector, the back-off intervals between RTS frames and the retransmission limits needs to follow the 802.11 specification. With the multiplexed search algorithm, if the station is in one of the sectors being searched, it is likely to be located much sooner and with lower overhead than with the serial search algorithm; if the STA is not in these sectors, this can be detected much sooner with the same overhead. If $STA_A$ is not found in the sectors listed in $L_A$, the AP will start an exhaustive search in the remaining sectors. If $STA_A$ can not be reached anywhere, the AP may decide that the $STA_A$ has left its coverage area or is turned off. The AP would then terminate the association of $STA_A$.

Note that a complete roaming solution in a WLAN network includes both the MAC layer and the network layer, because a station is likely to move from the coverage area of one AP to another AP, as well as to move from one sector of an AP to another sector of the same AP. For the first case (inter-AP hand-off), the two APs need to exchange additional information, such as network layer packets, for tasks like authentication, context transfer and mobile IP (or other networking layer mobility management protocol) handoff. For the second case (inter-sector handoff), the S-MAC APs only need to switch a station from one sector to another at the MAC layer by updating the location/link quality vector only, making it transparent to the network layer.

Figure 7:
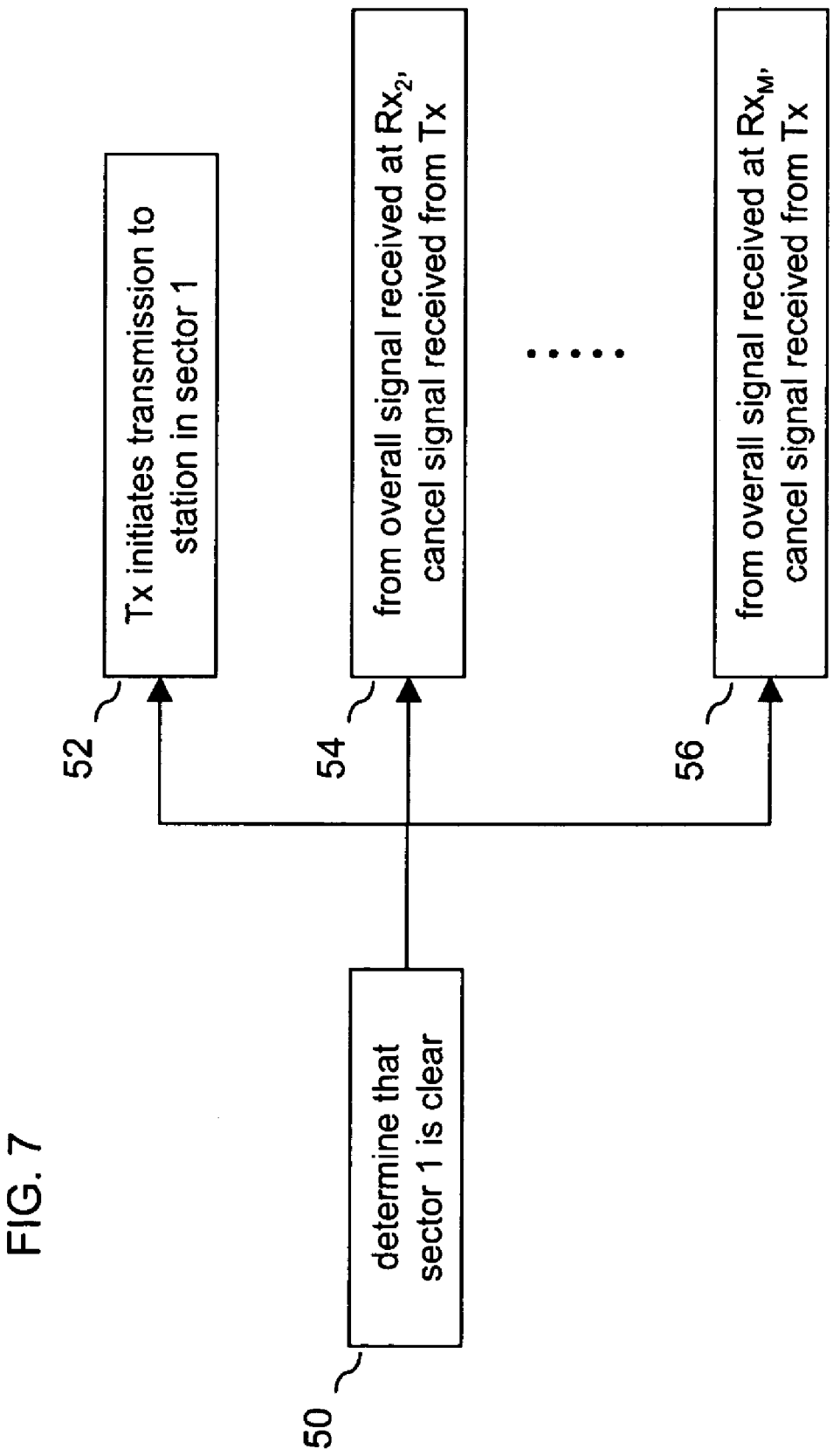
FIG. 7 illustrates a method of operating a wireless station to transmit a signal in one sector while listening for remote wireless stations in other sectors.

An S-MAC station 100 can continue to monitor the channel in other sectors while it is engaged in a transmission in a different sector. For example, when the Tx is transmitting in a sector (sector 1 for example), Tx and $Rx_1$ would still operate in time division duplex mode, but the remaining M−1 Rx modules continue to listen in their sectors. Because of antenna patterns like side lobes, the remaining Rx modules might receive signals transmitted by Tx. As such, these remaining stations might need to cancel the interference caused by Tx. Note that in embodiments having multiple transmitters, at each Rx, the interference from the multiple, simultaneous transmissions need to be cancelled. FIG. 7 illustrates this process in a station with antennas 1 through M. Once the station determines that a sector is clear, 50, the station transmits a signal using the antenna corresponding to the sector, 52. However, because receiving modules $Rx_2$ through $Rx_M$ might receive the signal transmitted in sector 1, at operations 54 through 56 the station cancels from any signals received at $Rx_2$ through $Rx_M$ the component that corresponds to the signal transmitted from Tx.

Self-interference cancellation can be done at the PHY layer. With S-MAC, $Rx_i$ continues receiving correctly while Tx is transmitting in another sector, j. This is accomplished if $Rx_i$ cancels the interference caused by Tx. Because the $Rx_i$ and Tx modules are part of the same PHY layer and controlled by the same MAC module, $Rx_i$ knows the transmitted symbol. Therefore $Rx_i$ only needs to estimate the channel gain, $G_{ij}$, between antennas i and j to cancel the Tx signal. For orthogonal frequency division multiplexing ("OFDM") based schemes, like 802.11a or g, cancellation of the Tx signal can be done easily in Rx after applying fast Fourier transform ("FFT") given the channel gain between different sectors. Note that channel estimation is already required by all the 802.11(a/b/g) PHY layers. Every frame starts with a PLCP preamble (SYNC sequence), which is used for channel estimation by the receiver. A similar SYNC sequence is used here. Channel estimation from one antenna to another is called self-calibration because both the transmitter and the receiver belong to the same station.

To estimate the channel properly, an S-MAC station needs to make sure that its self-calibration signal is not corrupted by other signals. Described below are two schemes, both ensuring interference-free self-calibration. One works at the MAC layer and applies to all types of PHY, the other works at the PHY layer and applies to OFDM-based PHY layer like 802.11a/g.

Figure 8:
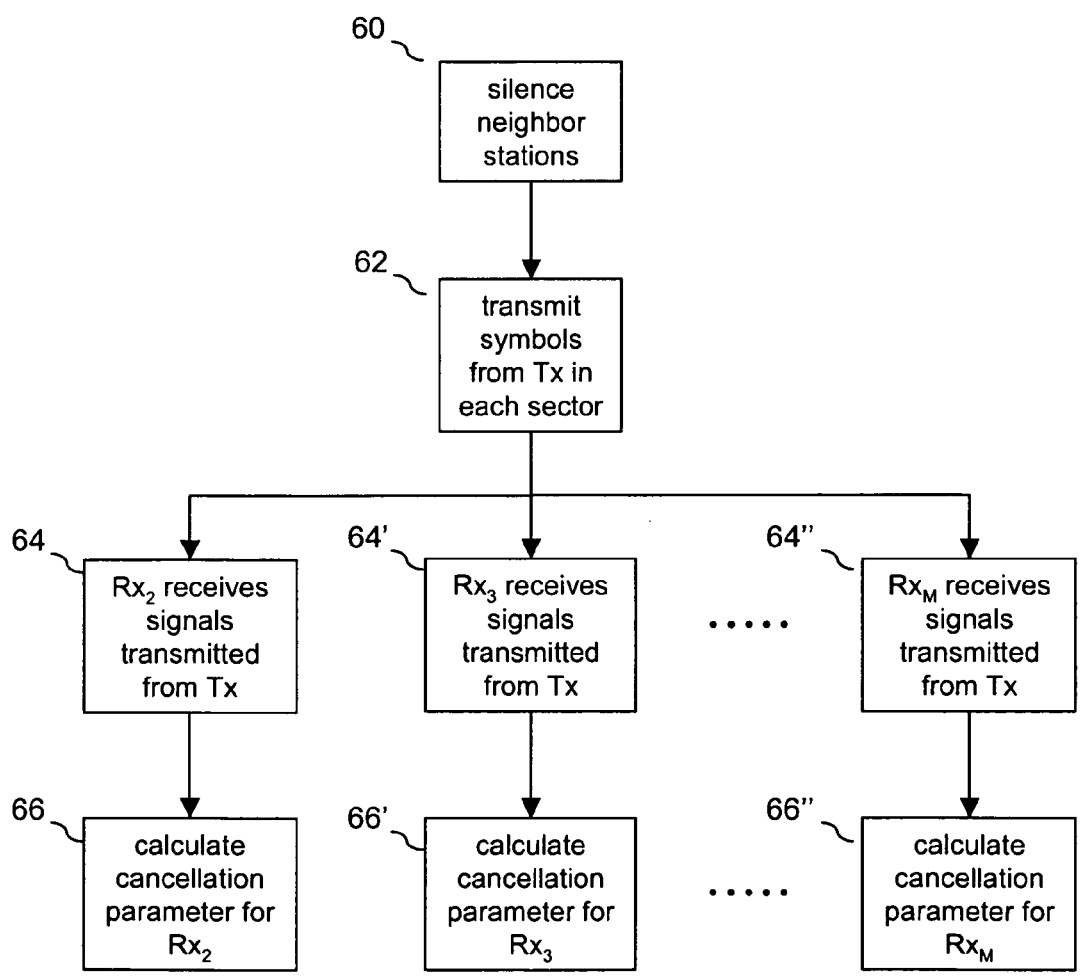
FIG. 8 illustrates a method of calibrating cross antenna channel coefficients that includes silencing neighbor stations.

FIG. 8 illustrates MAC assisted self-calibration. An S-MAC station 100 follows the normal carrier sensing/back off procedure before it starts self-calibration. First it transmits RTS frames circularly in every sector to silence its neighbor stations, 60. Next it transmits training symbols (SYNC) circularly in all sectors for channel estimation between pairs of antennas, 62. As the RTS is sent in the M sectors one by one, the advertised duration field of the RTS frames may decrease gradually, but the duration needs to be sufficient for the stations in this sector to back off until the SYNC symbols have been transmitted in all M sectors. After the circular RTS frames are sent, the SYNC symbol is transmitted circularly. While it is sent in sector i, every $Rx_j$, with $j \neq i$, in the other sectors that receives the signal, 64-64'', can estimate the channel gain $G_{ij}$ 66-66'', or any other parameters needed for cancellation. Considering the channel symmetry $G_{ij}=G_{ji}$, one could choose either to average $G_{ij}$ and $G_{ji}$ to reduce the estimation error or only to send SYNC in half of the sectors to reduce the overhead. How often this procedure is invoked will depend on the dynamics of the radio propagation environment. Because the channel reservation is done at the MAC layer, it is applicable to all PHY layers.

Figure 9:
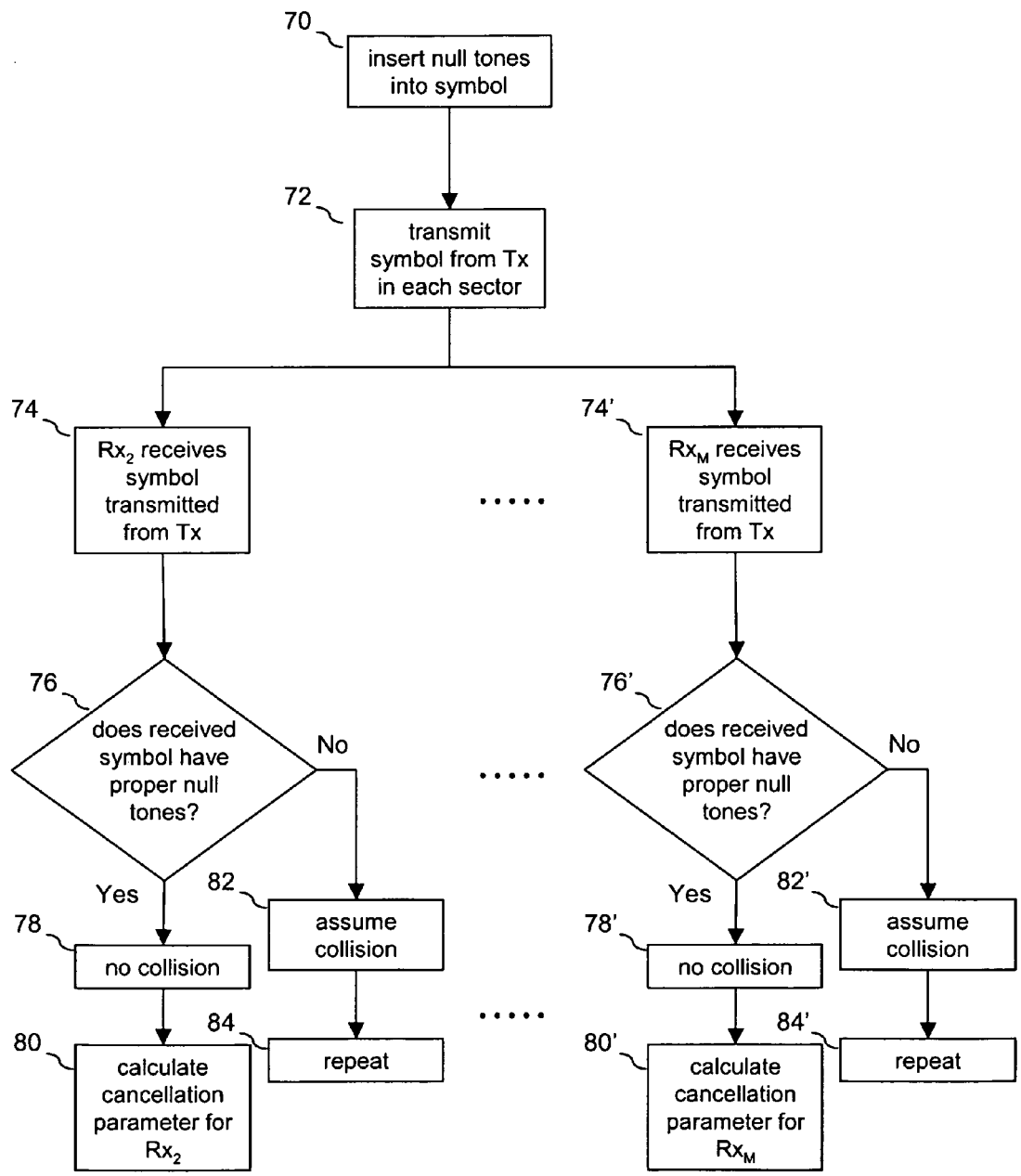
FIG. 9 illustrates a procedure for calibrating cross antenna channel coefficients that does not include silencing neighbor stations.

Another scheme is referred to as coded pilot tone assisted self-calibration for OFDM and illustrated by FIG. 9. OFDM is used in 802.11a and g for signaling. In the coded pilot tone assisted self-calibration scheme, the medium is not acquired first at the MAC layer. Therefore self-calibration is vulnerable towards interference from other transmissions, so the station could detect collisions during the self-calibration procedure.

To detect collisions at the PHY layer, coded pilot tones (null tones) are added to the training symbols, 70. The key to this method of collision detection is to generate a binary random sequence X and use this sequence to insert null tones in the training symbol at locations that correspond to the 0's in the sequence. For example, for a 802.11a system, a sequence of length 52 is generated and mapped to the 52 sub-carriers (excluding the DC tone) for channel estimation and collision detection. As an example, let $$X_{\{-26,26\}}=\{x_{-26}, \ldots, x_{-1}, 0, x_1, \ldots, x_{26}\}, \text{ where } x_i=0 \text{ or } 1.$$

Every 0 in the sequence represents a null pilot (no signal transmitted), and every 1 in the sequence is mapped to a pilot tone and modulated with a BPSK symbol. The modulation of the pilot tones follows the long training symbol of the PLCP preamble (SYNC) in the 802.11a:

$$L_{\{-26,26\}}=\{l_{-26}, \ldots, l_{-1}, 0, l_1, \ldots, l_{26}\}, \text{ where } l_i \in \{1,-1\},$$

and $$L'_{\{-26,26\}}=\{l'_{-26}, \ldots, l'_{-1}, 0, l'_1 l'_1, \ldots, l'_{26}\}, \text{ where } l'_i=x_i*l_i(-26 \leq i \leq 26).$$

In other words, the long OFDM training symbol $L_{\{-26,26\}}$ of SYNC in 802.11a is punctured in the frequency domain by null tones whose positions are determined by the 0s in the random sequence. The coded SYNC word $L'_{\{-26,26\}}$ is used for both channel estimation and collision detection. Additional long training symbols can be added to the SYNC sequence for better estimation.

After following the standard channel sensing and back-off, a coded SYNC is sent through antenna i, 72. Every receiver in the other sectors, $R_x$, $j \neq i$, that receives the symbol, 74-74', can detect possible collisions using the null tones, 76-76', and then estimate the channel gain $G_{ij}$ using the pilot tones. If substantial energy is sensed in the null tones by $Rx_j$, a collision is detected, 82-82', and the channel estimation between antennas i and j is thus invalid. Upon collision detection, the self-calibration procedure can be repeated after the AP determines the channel is available at a later time, 84-84'. If no collision is detected, 78-78', channel estimation between antenna i and j is obtained by interpolating between the pilot tones, 80-80'. This scheme allows clear channel assessment (CCA) to be carried out in the null tones at the same time as channel estimation.

Using the randomly placed null tones makes it easy to detect collisions with self-calibration signals sent by another S-MAC station as well as collisions with regular frames. A station can use its MAC address and current time stamp as a seed to generate its (pseudo) random sequence. This reduces the probability that two stations choose the same sequence at the same time. If there are too many 0s in the sequence or too many 0s are adjacent, the sequence should be discarded and a new sequence should be generated.

Similarly to the MAC controlled self-calibration scheme, one can take advantage of the channel symmetry and send SYNC frames in only half the sectors. The M (or M÷2) SYNC words can be sent contiguously or separately. It is possible that when a SYNC is sent, collisions take place only at some of the receivers. In this case the self-calibration process needs to be repeated only to fill in the parts that suffer from the collision. Without the MAC overhead, the channel usage is much less than with the MAC controlled scheme. With 802.11a the time required to send SYNC is only 16 us. So the overall overhead is very light, even after considering the repeated trials that may be required due to collisions. How often self-calibration is required depends on how often the environment (such as nearby reflectors) changes. The overhead is very small even if self-calibration is performed at a relatively high rate.

When there is a large coupling between the antennas, the Tx will present a stronger interference to a Rx. This requires the receiver to have a larger dynamic range. For this reason, antenna configurations with small cross correlations are preferred. The dynamic range (DR) at Rx is determined by the maximum transmission power of the Tx ("MaxTxPwr"), the cross talk between different antennas ("CxTlk"), the required minimal receiver sensitivity ("MinRxPwr") and the peak-to-average ratio of the OFDM signal ("PAR"), where $$DR=\text{MaxTxPwr}-\text{CxTlk}-\text{MinRxPwr}+PAR.$$

For example, consider a 802.11a signal with MinRxPwr=−82 dBm, PAR=10 dB. If MaxTxPwr=15 dBm and CxTk=23 dB then DR=84 dB, which can be represented by 14 bits. A 14-bit ADC with 65 Msps is sufficient for this application and can be purchased off-the shelf. Considering the gain from directional transmission for a 3 sector case, an additional 4.7 dB gain can be achieved over an omni antenna. This is equivalent to 19.7 dBm transmission power in an omni setting. In a typical outdoor environment where propagation loss is proportional to the fourth power of distance, this covers 73% more area than a regular station with omni-antenna. This is particularly attractive to the access points in the infrastructure mode, where both higher capacity and larger coverage area are important.

Because an S-MAC station always listens for incoming frames in all directions, it is aware of all the stations within its range which transmit in its way. This is the same as a regular station with an omni antenna. By checking which antenna receives the frame, it also learns in which sector these neighbors are located. However, an S-MAC station could send the same type of neighbor discovery frames as an omni station sends (like the beacon signal sent by an AP in infrastructure mode or the Hello frame sent in ad hoc mode). In such embodiments, the S-MAC station could send the discovery frames once in each sector to make itself known to its neighbors in all directions. This extra overhead (sending neighbor discovery frames M times) makes the neighbor discovery process only slightly heavier that in a network with only omni stations.

Figure 10:
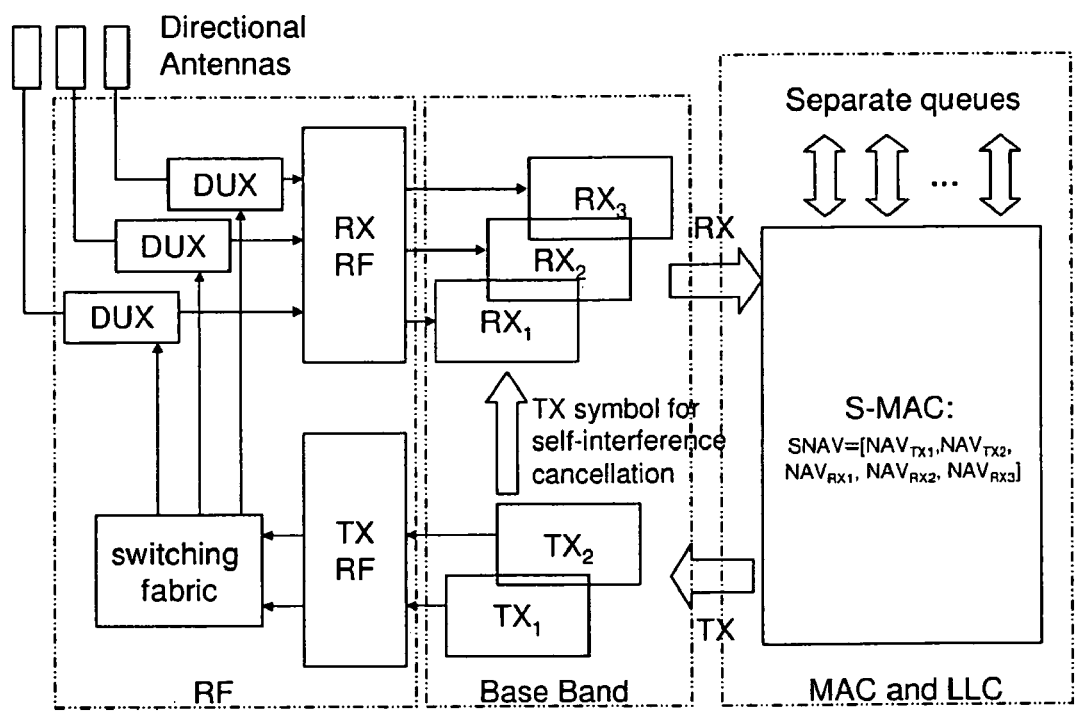
FIG. 10 shows an embodiment of a wireless station having three receiving modules and two transmitting modules.

FIG. 10 illustrates another embodiment of the present invention that uses two transmitting modules, $Tx_1$ and $Tx_2$, and three receivers, $Rx_1$, $Rx_2$, $Rx_3$. This Figure shows one possible way a person could structure the transmitting modules, receiving modules, and various other components that could make up an S-MAC station.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The S-MAC protocol does not change the MAC message format transmitted over the air. This makes an S-MAC node fully interoperable with nodes using omni-directional antennas and the standard 802.11 MAC protocol. Thus, operating a network of nodes using a mixture of omni-directional and directional antennas is possible, and S-MAC nodes can be gradually introduced into a network already deployed to enhance the capacity without causing incompatibility.

The many features and advantages of the invention are apparent from this detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. Additionally this application incorporates by reference the paper "Enhancing 802.11 Wireless Networks with Directional Antenna and Multiple Receivers" by Chenxi Zhu, Tamer Nadeem, and Jonathan Agre, Fujitsu Laboratories of America, Technical Memorandum No: FLA-PCR-TM-21.

What is claimed is:

1. A method of operating a wireless station, comprising:
   associating a first backoff timer with a first receiver associated with a first directional antenna;
   associating a second backoff timer with a second receiver associated with a second directional antenna;
   operating the first and second receivers to communicate with a single media access control (MAC) module;
   operating the first receiver to monitor via the single MAC module for transmissions from a remote wireless station, when operating the second receiver via the single MAC module to monitor for transmissions from a remote wireless station and when transmitting signals using the second directional antenna;
   in response to the first receiver sensing a transmission from a remote wireless station, activating the first backoff timer;
   in response to the second receiver sensing a transmission from a remote wireless station, activating the second backoff timer; and
   when a remote wireless station fails to respond to a frame transmitted from the first directional antenna, transmitting first search signals from the first directional antenna and second search signals from the second directional antenna.

2. The method of claim 1, further comprising:
   while operating the first receiver to monitor for transmissions from a remote wireless station, operating the second receiver to monitor for transmissions from a remote wireless station.

3. The method of claim 1, further comprising,
   in response to the first receiver sensing a transmission from a remote wireless station, storing data associating the first receiver with the sensed remote wireless station.

4. The method of claim 3, further comprising:
   activating a third timer upon the associating of the first receiver with the sensed remote wireless station; and
   after expiration of the third timer, transmitting first search signals from the first directional antenna and second search signals from the second directional antenna.

5. The method of claim 1, further comprising:
   in response to the first receiver sensing a transmission from a remote wireless station, storing data describing the quality of the signals received by the first receiver from the sensed remote wireless station.

6. The method of claim 5, further comprising:
   selecting one of the directional antennas based on the stored data; and
   transmitting signals from the selected directional antenna.

7. The method of claim 1, further comprising:
   while operating the first receiver to detect a transmission from a remote wireless station, transmitting signals using the second directional antenna.

8. The method of claim 7, further comprising:
   cancelling from any signals output by the second directional antenna, a cancellation amount representing signals received by the first directional antenna from the second antenna.

9. The method of claim 8, wherein a parameter of the cancellation amount is determined by a method comprising:
   transmitting training signals from the second directional antenna;
   receiving the training signals at the first directional antenna;
   determining a channel parameter of a channel between the second directional antenna and the first directional antenna based on a value of the training signals received at the first directional antenna; and
   determining the cancellation amount based on the channel parameter between the second directional antenna and the first directional antenna and a signal transmitted by the second directional antenna.

10. The method of claim 9, wherein the method for determining a parameter of the cancellation amount further comprises:
    before transmitting the training signals, silencing any neighboring remote stations by transmitting channel reservation signals from all directional antennas.

11. The method according to claim 10, wherein collisions are detected based on the substantial signal received at the subcarriers corresponding to the null tones in the training signals.

12. The method of claim 9, wherein the training signals are transmitted according to a multi-carrier modulation and the method for determining the parameter of the cancellation amount further comprises:

as null tones include in the multi-carrier training signals subcarriers where no signal is transmitted; and determining whether the training signals received at the first directional antenna includes a substantial signal at the subcarrier position of the null tones.

13. The method according to claim 8, wherein the canceling is based upon estimating a channel between the first and second directional antennas and the channel estimating comprises:

receiving with the first directional antenna a multi-carrier signal transmitted from the second directional antenna;

in response to a determination that the received multi-carrier signal contains a significant signal in a subcarrier where no signal is transmitted by the second directional antenna, detecting as a collision that the transmission from the first directional antenna occurred concurrently with a transmission from a remote wireless station; and repeating the channel estimating according to the detected collision.

14. The method according to claim 1, further comprising:

associating three or more directional antennas and respective receivers that are in communication with the signal MAC module; and canceling an interference between any transmitting directional antennas and receiving directional antennas with a cancellation amount calculated based on a channel parameter between the transmitting directional antenna and the receiving directional antenna and the signal transmitted by the transmitting directional antenna.

15. The method of claim 14, wherein the channel parameter for the cancellation amount is determined by:

transmitting training signals according to a multi-carrier modulation from a directional antenna;

receiving the training signal at other directional antenna;

as null tones include in the multi-carrier training signals subcarriers where no signal is transmitted; and determining whether the training signals received at the other directional antenna includes a substantial signal at the subcarrier position of the null tones.

16. The method of claim 15, further comprising:

before transmitting the training signals, silencing any neighboring remote stations by transmitting a channel reservation signal from all the directional antennas.

17. An apparatus implementing any one of the methods according to claims 1-12 or 14.

18. A computer readable medium comprising a program causing a computer to execute any one of the methods according to claim 12 or 14.

* * * * *

UNITED STATES PATENT AND TRADEMARK OFFICE
CERTIFICATE OF CORRECTION

PATENT NO. : 7,630,343 B2  Page 1 of 1
APPLICATION NO. : 11/389014
DATED : December 8, 2009
INVENTOR(S) : Chenxi Zhu et al.

It is certified that error appears in the above-identified patent and that said Letters Patent is hereby corrected as shown below:

Column 12, Line 29, change "claim 12 or 14." to --claims 1-10, 12, or 14.--

Signed and Sealed this

Sixteenth Day of March, 2010

David J. Kappos
*Director of the United States Patent and Trademark Office*